(12) United States Patent
Martino et al.

(10) Patent No.: US 10,145,205 B2
(45) Date of Patent: Dec. 4, 2018

(54) SYSTEM FOR CONTROLLING FLUID FLOW

(71) Applicant: Cameron International Corporation, Houston, TX (US)

(72) Inventors: Jerry A. Martino, Houston, TX (US); Declan Elliott, Longford (IE); James Amberg, Cypress, TX (US)

(73) Assignee: Cameron International Corporation, Houston, TX (US)

( * ) Notice: Subject to any disclaimer, the term of this patent is extended or adjusted under 35 U.S.C. 154(b) by 344 days.

(21) Appl. No.: 14/519,015

(22) Filed: Oct. 20, 2014

(65) Prior Publication Data
US 2016/0108699 A1   Apr. 21, 2016

(51) Int. Cl.
*E21B 34/02* (2006.01)
*F16K 1/12* (2006.01)
*F16K 3/26* (2006.01)

(52) U.S. Cl.
CPC .............. *E21B 34/02* (2013.01); *F16K 1/123* (2013.01); *F16K 3/265* (2013.01)

(58) Field of Classification Search
CPC .... G05D 16/103; G05D 16/106; E21B 34/08; Y10T 137/7791; Y10T 137/7801; Y10T 137/7834
USPC .................................... 137/503, 508, 505.18
See application file for complete search history.

(56) References Cited

U.S. PATENT DOCUMENTS

| | | | | |
|---|---|---|---|---|
| 545,714 A * | 9/1895 | McGrath | .............. | G05D 16/103 137/505.25 |
| 2,367,106 A * | 1/1945 | Dolch | ..................... | F16K 47/12 137/508 |
| 3,294,113 A * | 12/1966 | Chenoweth | ............. | E21B 34/08 137/508 |
| 3,545,485 A * | 12/1970 | Clark | ................... | G05D 16/103 137/508 |
| 3,933,338 A * | 1/1976 | Herd | .................... | F16K 31/1225 251/63.6 |
| 4,137,933 A | 2/1979 | Culpepper | | |
| RE30,115 E * | 10/1979 | Herd | ................... | F16K 31/1225 137/236.1 |
| 4,416,301 A * | 11/1983 | Brumm | ................... | F16K 1/123 137/220 |
| 4,438,980 A * | 3/1984 | Lippiatt | .................... | B60T 8/26 137/102 |
| 4,569,370 A * | 2/1986 | Witt | ......................... | F16K 3/26 137/625.3 |
| 4,825,895 A | 5/1989 | Maltman | | |

(Continued)

OTHER PUBLICATIONS

PCT International Search Report & Written Opinion for PCT Application No. PCT/US2015/052732 dated Apr. 5, 2016, 12 Pages.

*Primary Examiner* — Eric Keasel

(74) *Attorney, Agent, or Firm* — Fletcher Yoder, P.C.

(57) ABSTRACT

A system includes a choke valve having a fluid inlet configured to receive a fluid at a first pressure and a fluid outlet configured to output the fluid at a second pressure. The choke valve also includes a fixed component and a movable component defining a throttling orifice between the fluid inlet and the fluid outlet. Additionally, the movable component is configured to automatically move relative to the fixed component in response to a change in the first pressure to maintain a consistent percent pressure drop between the first pressure at the fluid inlet and the second pressure at the fluid outlet.

18 Claims, 6 Drawing Sheets

(56) References Cited

U.S. PATENT DOCUMENTS

| | | |
|---|---|---|
| 5,431,188 A | 11/1995 | Cove |
| 6,283,152 B1 * | 9/2001 | Corte, Jr. ............... F16K 1/443 |
| | | 137/614.11 |
| 2011/0017311 A1 | 1/2011 | Mathiesen et al. |

* cited by examiner

SYSTEM FOR CONTROLLING FLUID FLOW

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In certain fluid-handling systems, such as mineral extraction systems, a variety of flow control devices are used to control a flow rate, a pressure, and other parameters of a fluid flow. For example, in mineral extraction systems, chokes may be utilized to regulate the flow of production fluid (e.g., oil, gas, and water) from a well. Unfortunately, typical control systems and mechanical components, such as actuators, used to control chokes may be complex and costly. Furthermore, it is difficult to achieve a suitable pressure drop balance across multiple chokes in series using conventional techniques for adjusting chokes.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

Figure 1:
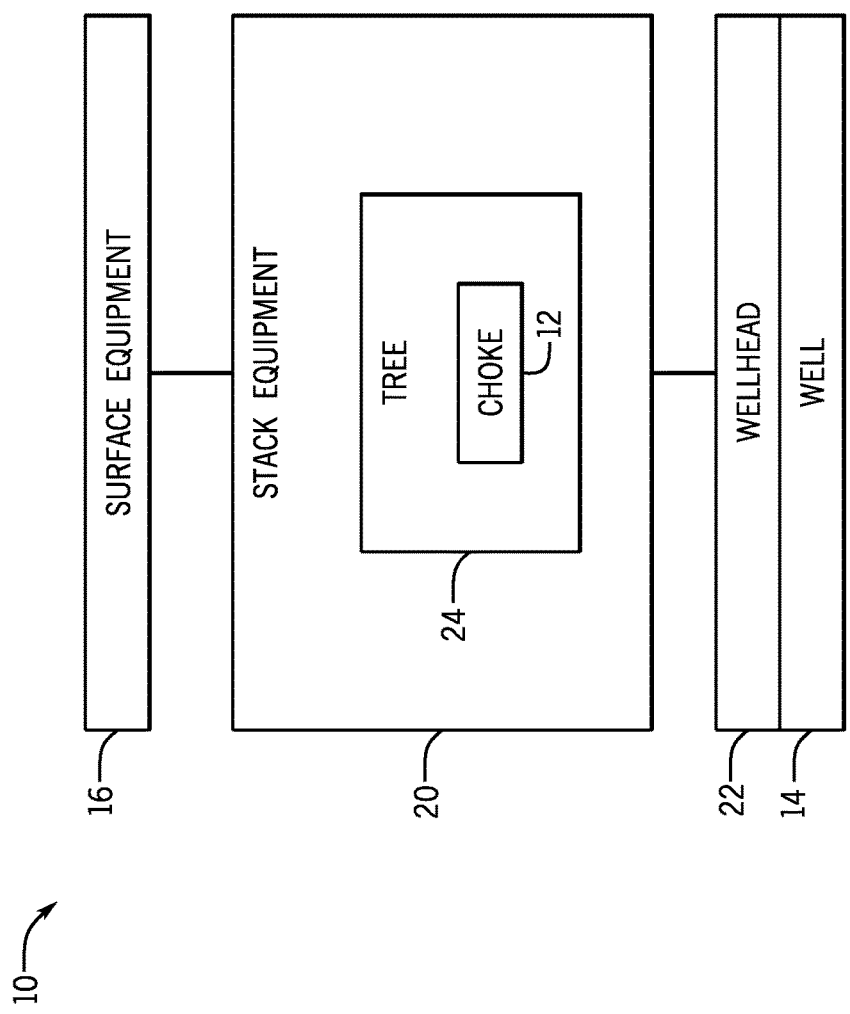
FIG. 1 is a block diagram of a mineral extraction system having a choke, in accordance with an embodiment of the present disclosure.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain embodiments of the present disclosure include an adjustable choke for controlling a flow of fluid (e.g., gas and/or liquid) within a fluid-handling system. In particular, the choke disclosed herein may be configured to restrict the flow of the fluid in a flow path, thus throttling the flow. The choke may be utilized as part of any suitable fluid-handling system, such as an energy-acquisition or processing system, e.g., a hydrocarbon-production or processing system, such as a subsea or surface oil or gas well, a pipeline, a natural-gas processing terminal, a refinery, or a natural-gas powered electrical plant, or the like. In some embodiments, the choke may be utilized as part of a gas-uplift system, a water-injection system, a water/steam/chemicals injection system, or other system for conveying fluids.

In certain embodiments, the choke includes a fixed component and a movable component. The flow restriction provided by the choke is variable and depends on the position of the fixed component relative to the movable component. For example, a flow area of a throttling orifice is adjusted as the movable component moves relative to the fixed component. In certain embodiments, the movable component is configured to automatically move (e.g., translate) in response to changes in an inlet pressure (e.g., an upstream pressure) at an inlet of the choke. As discussed in more detail below, the movable component is configured to automatically move to a position which provides a particular percent pressure drop (e.g., change in pressure) between the inlet and an outlet of the choke. The disclosed choke mechanically self-adjusts to provide the percent pressure drop without the use of complex electronic controllers, motors, or actuators. In certain embodiments, the disclosed choke mechanically self-adjusts (e.g., freely moves or translates) in response to pressures across the choke without the use of biasing members (e.g., springs) or magnets or the like, although in certain embodiments biasing members, magnets, or the like may be utilized to supplement and/or to adjust the percent pressure drop provided between the inlet and the outlet of the choke.

As discussed in more detail below, the disclosed choke may be particularly desirable for use in conjunction with another choke in series. For example, a first choke (e.g., an upstream choke) may be an adjustable choke controlled manually by an operator and/or by a system of electronic controls and actuators that is configured to output high-pressure fluid at a particular pressure. The second choke (e.g., a downstream choke), configured in accordance with the presently disclosed embodiments, may receive the high-pressure fluid at the particular pressure output by the first choke. The movable component of the second choke may be configured to automatically translate (e.g., self-adjust) to a position in response to the particular pressure output by the first choke, thereby enabling the second choke to provide a particular percent pressure drop across the second choke without the use of additional electronic controls, motors, and/or actuators dedicated to the second choke.

By way of another example, in certain embodiments, a first choke (e.g., an upstream choke) may be configured in accordance with the presently disclosed embodiments and may be configured to self-adjust in response to an inlet pressure, thereby enabling the first choke to provide a particular percent pressure drop across the first choke without the use of additional electronic control and actuators dedicated to the first choke. In such cases, the second choke (e.g., a downstream choke), may have a similar configuration as the first choke or may be an adjustable choke that is controlled manually by an operator and/or by a system of electronic controls, motors, and/or actuators, for example.

Furthermore, the disclosed embodiments may be particularly useful in high-pressure fluid-handling systems, such as hydraulic fracturing ("fracing") operations. In such systems, fluid is injected into the ground at high pressure (e.g., greater than 5,000 psi, 10,000 psi, or 15,000 psi) to fracture a hydrocarbon containing reservoir, and the hydrocarbon gas released from the reservoir may be released at similarly high pressures. Accordingly, many such systems utilize multiple chokes in series, which, as noted above, may be expensive and difficult to control using typical techniques. Additionally, the pressure required to release hydrocarbons from the reservoir typically decreases over time, rendering the use of multiple chokes in series and/or typical complex choke control systems unnecessary during later stages of extraction operations. Thus, operators may prefer an easily adjustable choke with relatively inexpensive components, such as the choke disclosed herein.

With the foregoing in mind, FIG. 1 illustrates a mineral extraction system 10 having a choke 12 (e.g., a choke valve), in accordance with an embodiment. The choke 12 is illustrated within the mineral extraction system 10 to facilitate discussion. However, as noted above, the choke 12 may be utilized as part of any suitable fluid-handling system. In the illustrated embodiment, the system 10 is configured to facilitate the extraction of a resource, such as oil or natural gas, from a well 14. As shown, the system 10 includes a variety of equipment, such as surface equipment 16 and stack equipment 20, for extracting the resource from the well 14 by way of a wellhead 22. The system 10 may be used in a variety of drilling or extraction applications.

As can be appreciated, the surface equipment 16 may include a variety of devices and systems, such as pumps, power supplies, cable and hose reels, control units, a diverter, a gimbal, a spider, and the like. The stack equipment 20 of FIG. 1 includes a production tree 24, also commonly referred to as a "Christmas tree." The tree 24 may include components that control the flow of an extracted resource out of the well 14 and upward toward the surface equipment 16 or that control the flow of injected fluids into the well 14. For instance, the tree 24 may include various valves and conduits, a flow meter, sensors, and so forth. In some embodiments, the tree 24 may also provide additional functions, including chemical injection functionality and pressure relief. In some embodiments, the choke 12 that is configured to regulate the flow rate of materials extracted from the well 14 and/or the flow rate of materials injected into the well 14 may be within the tree 24. However, the choke 12 may be positioned within any suitable component of the system 10. Additionally, in some embodiments, the choke 12 may be configured to be removably coupled to the tree 24 or other suitable component of the system 10, thereby enabling the choke 12 to be used temporarily during particularly high-pressure operations and/or to be moved between and reused within different systems 10.

Figure 2:
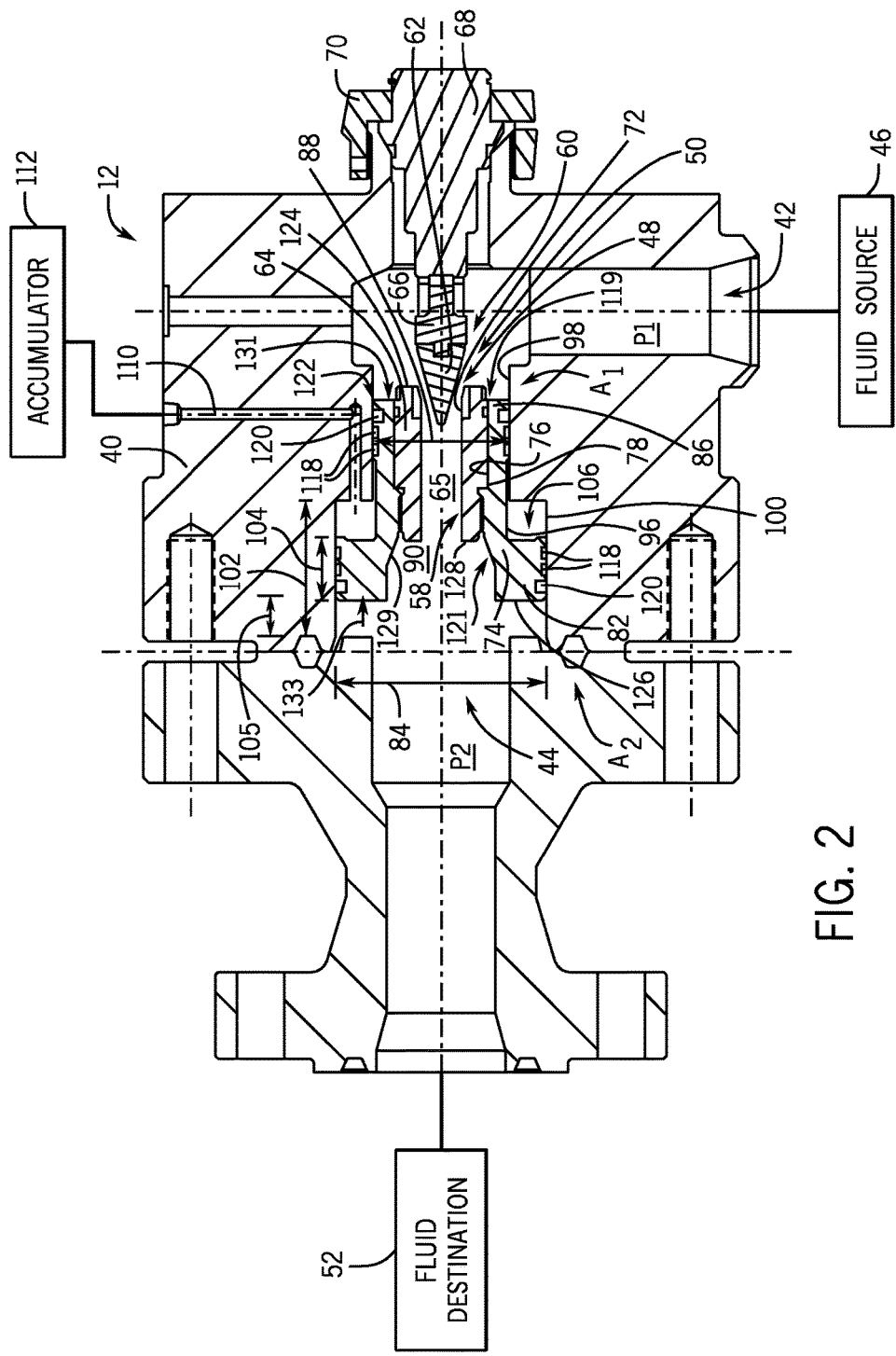
FIG. 2 is a cross-sectional side view of the choke of FIG. 1, in accordance with an embodiment of the present disclosure.

FIG. 2 is a cross-sectional side view of the choke 12 of FIG. 1, in accordance with an embodiment. As shown, the choke 12 includes a choke body 40, an inlet 42, and an outlet 44. A fluid source 46 provides a fluid that travels through the inlet 42. The fluid flows through a throttling orifice 48 of the choke 12 as shown by arrows 50 (e.g., a fluid flow path) and toward a fluid destination 52 via the outlet 44. The fluid source 46 may include any of a variety of suitable fluid sources, such as an oil or natural gas well, a pipeline, a tanker, or upstream components of a processing plant. The fluid source 46 may supply any of a variety of fluids (e.g., gases and/or liquids), such as air, natural gas, oil, water (steam or liquid), or any combination thereof. The fluid flowing through the inlet 42 from the source 46 may be at relatively high pressures (e.g., pressures greater than 500 psi, 1000 psi, 5000 psi, 10,000 psi, or 15,000 psi). As discussed in more detail below, the choke 12 is configured to adjust a cross-sectional area (e.g., a flow area) of the throttling orifice 48 to reduce the pressure of the fluid as the fluid flows from the inlet 42 to the outlet 44.

In the illustrated embodiment, the choke 12 has a needle and seat trim 60 (e.g., annular trim) with a fixed needle 62 and a movable seat 64 (e.g., annular movable seat). The flow area of the throttling orifice 48 changes as the seat 64 moves relative to the fixed needle 62. The seat 64 is generally annular and includes an opening 65 that is configured to receive the needle 62 and that is configured to enable fluid flow through the choke 12. The needle 62 may be coupled (e.g., brazed) to a threaded plug 66, which may be coupled (e.g., threadably coupled) to a stem 68 (e.g., a bonnet stem). The stem 68 may be coupled to the choke body 40 via any suitable fastener 70 (e.g., a wing nut or bolted retainer). Thus, the needle 62 is a fixed component that is held in a fixed position relative to the choke body 40 and relative to the inlet 42. The needle 62, the seat 64, and other components of the choke 12 may be formed from any suitable material. For example, the needle 62 may be formed from carbide, and the seat 64 may be formed from a steel alloy and may include carbide tips 72.

As shown, the seat 64 of the trim 60 is coupled to an intensifier piston 74 (e.g., annular piston). Together, the seat 64 and the intensifier piston 74 may form a movable component 58 of the choke valve 12 and may move together (e.g., slidingly move or slide) relative to the needle 62 and/or within the choke body 40. The seat 64 may be coupled to the intensifier piston 74 via any suitable coupling, such as a removable coupling. For example, in the illustrated embodiment, a radially-outer surface 76 of the seat 64 is threadably coupled to a radially-inner surface 78 of the intensifier piston 74. Such a configuration may desirably enable replacement of the seat 64. However, in some embodiments, the seat 64 and the intensifier piston 74 may be integrally and gaplessly formed (e.g., from a single continuous material) and/or the intensifier piston 74 may form the seat 64 that is configured to receive the needle 62, for example. In such cases, the intensifier piston 74 may include certain features noted above with respect to the seat 64. For example, the intensifier piston 74 may form the opening 65 that is configured to receive the needle 62 and/or may include carbide tips 72.

The intensifier piston 74 includes a first portion 82 having a first diameter 84 and a second portion 86 having a second diameter 88, smaller than the first diameter. As shown, the first portion 82 and the second portion 86 are generally annular, enabling the fluid to flow through the opening 65 of the seat and/or a central passageway 90 of the intensifier piston 74. The intensifier piston 74 is supported by the choke body 40. In particular, a radially-outer surface 96 (e.g., annular surface) of the intensifier piston 74 is supported by and is in contact with a radially-inner surface 98 (e.g., annular surface) of the choke body 40. The radially-inner surface 98 of the choke body 40 has a shape that corresponds to the intensifier piston 74. For example, a recess 100 (e.g., an annular recess) is provided in the radially-inner surface 98 the choke body 40 to accommodate the first portion 82 of the intensifier piston 74. The recess 100 has a first length 102

(e.g., an axial length) greater than a second length 104 (e.g., an axial length) of the first portion 82 of the intensifier piston 74. Thus, the first portion 82 of the intensifier piston 74 may translate axially within the recess 100, as shown by arrow 105.

Additionally, a volume 106 (e.g., an annular volume or an annular fluid cavity) is formed between the radially-outer surface 96 of the second portion 86 of the intensifier piston 74 and the radially-inner surface 98 of the choke body 40 while the choke 12 is in an open position, as shown. In certain embodiments, a port 110 may extend between the volume 106 and an accumulator 112 (e.g., a fluid storage reservoir, such as an air over oil accumulator). In such cases, the volume 106 is configured to receive a fluid (e.g., air, oil, water, or the like) from the accumulator 112 via the port 110. The accumulator 112 may be configured to store the fluid at relatively low pressure, such that the fluid in the accumulator 112 does not significantly affect the position or the movement of the intensifier piston 74. The fluid in the accumulator 112 that is provided to the volume 106 via the port 110 may support and enable a change in the volume 106 as the intensifier piston 74 moves axially, as shown by arrow 105. For example, the ambient air or the fluid in the accumulator 112 may block formation of a vacuum in the volume 106. During certain operations and in certain configurations, small amounts of fluids passing through the inlet 42 of the choke 12 may flow into the volume 106 (e.g., around seals 118). In such cases, the accumulator 112 may advantageously block the escape of such fluids, which may contain hydrocarbons, for example, into the atmosphere. However, in some embodiments, the accumulator 112 may not be provided, and rather, the port 110 may vent to the atmosphere and the volume 106 may be configured to receive relatively low pressure ambient air via the port 110.

As noted above, one or more seals 118 (e.g., annular seals) may be provided along the radially-outer surface 96 of the intensifier piston 74. The seals 118 may extend circumferentially about the intensifier piston 74 and may be configured to block the flow of fluid between the volume 106 and the inlet 42 and/or the central passageway 90 of the intensifier piston 74, for example. In some embodiments, one or more scrapers 120 (e.g., annular scrapers) may be provided along the radially-outer surface 96 of the intensifier piston 74 to scrape and clean the radially-inner surface 98 of the choke body 40, for example. While the seals 118 and the scrapers 120 are shown on the radially-outer surface 96 of the intensifier piston 74, it should be understood that some or all of these components may be positioned on the radially-inner surface 98 of the choke body 40.

The disclosed structure enables the choke 12 to provide a consistent percent pressure drop (e.g., change in pressure) between an inlet pressure $P_1$ (e.g., an upstream pressure) at the inlet 42 and an outlet pressure $P_2$ (e.g., a downstream pressure) at the outlet 44 of the choke 12. Thus, the outlet pressure $P_2$ of the fluid is a certain percentage less than the inlet pressure $P_1$ across a range of various inlet pressures (e.g., even as the inlet pressure varies). The percent pressure drop provided by the choke 12 is based on a ratio of a first fluid contacting cross-sectional area $A_1$ (e.g., cross-sectional area perpendicular to a longitudinal axis of the movable component 58) at a first end 119 of the movable component 58 (e.g., a first sum of a cross-sectional area of a first end 122 of the intensifier piston 74 and a cross-sectional area of a first end 124 of the seat 64 in the illustrated embodiment) proximate the inlet 42, and a second fluid contacting cross-sectional contact area $A_2$ (e.g., cross-sectional area perpendicular to a longitudinal axis of the movable component 58) at a second end 121 of the movable component 58 (e.g., a second sum of a cross-sectional area of a second end 126 of the intensifier piston 74 and a cross-sectional area of a second end 128 of the seat 64 in the illustrated embodiment) proximate the outlet 44.

The movable component 58 (e.g., the intensifier piston 74 and the seat 64) may be configured to automatically move (e.g., self-adjust) to a position in which a first product of the first fluid contacting cross-sectional area $A_1$ and the inlet pressure $P_1$ equals a second product of the second fluid contacting cross-sectional area $A_2$ and the outlet pressure $P_2$ (e.g., $(A_1)(P_1)=(A_2)(P_2)$). Thus, a first force 131 exerted by the inlet pressure $P_1$ on the movable component 58 balances a second force 133 exerted by the outlet pressure $P_2$ on the movable component 58. By way of example, if the ratio of the first fluid contacting cross-sectional area $A_1$ and the second cross-sectional fluid contact area $A_2$ is approximately 1:3, a ratio of the outlet pressure $P_2$ to the inlet pressure $P_1$ will also be approximately 1:3. In this case, the choke 12 will automatically adjust to consistently reduce the pressure of the fluid flowing through the choke 12 by approximately ⅔. The choke 12 may be configured to have any suitable ratio of the first fluid contacting cross-sectional area $A_1$ to the second fluid contacting cross-sectional area $A_2$ (e.g., by varying the size and/or configuration of the intensifier piston 74 and/or the seat 64), such as approximately 2:1, 3:1, 4:1, 5:1, 6:1, 7:1, 8:1, 9:1, 10:1, or any ratio therebetween. In some embodiments, the ratio may be between approximately 2-10:1, 3-9:1, 4-8:1, or 5-7:1, for example. Thus, the choke 12 may be configured (e.g., have a particular ratio of the first fluid contacting cross-sectional area $A_1$ to the second fluid contacting cross-sectional area $A_2$) to reduce the pressure of the fluid flowing through the choke 12 by approximately 10-90 percent, 20-80 percent, 30-70 percent, 40-60 percent, or 50-70 percent, or any other suitable percentage. As noted above, the disclosed embodiments enable the choke 12 to automatically throttle the flow of fluid and provide a consistent percent pressure drop without manual adjustment of the choke 12 by an operator and/or without electronic adjustment of the choke 12 (e.g., without an electronic control system that controls an actuator to move the choke 12). As shown, the intensifier piston 74 includes a shoulder 129 (e.g., annular shoulder) extending axially and radially-inwardly from the first portion 82 of the intensifier piston 74. In some embodiments the shoulder 129 may not be present; however, one of ordinary skill in the art would understand that the forces exerted by the fluid on the shoulder 129, and other geometrical variations, should also be taken into account in determining the ratio between the first fluid contacting cross-sectional area $A_1$ and the second fluid contacting cross-sectional area $A_2$.

Figure 3:
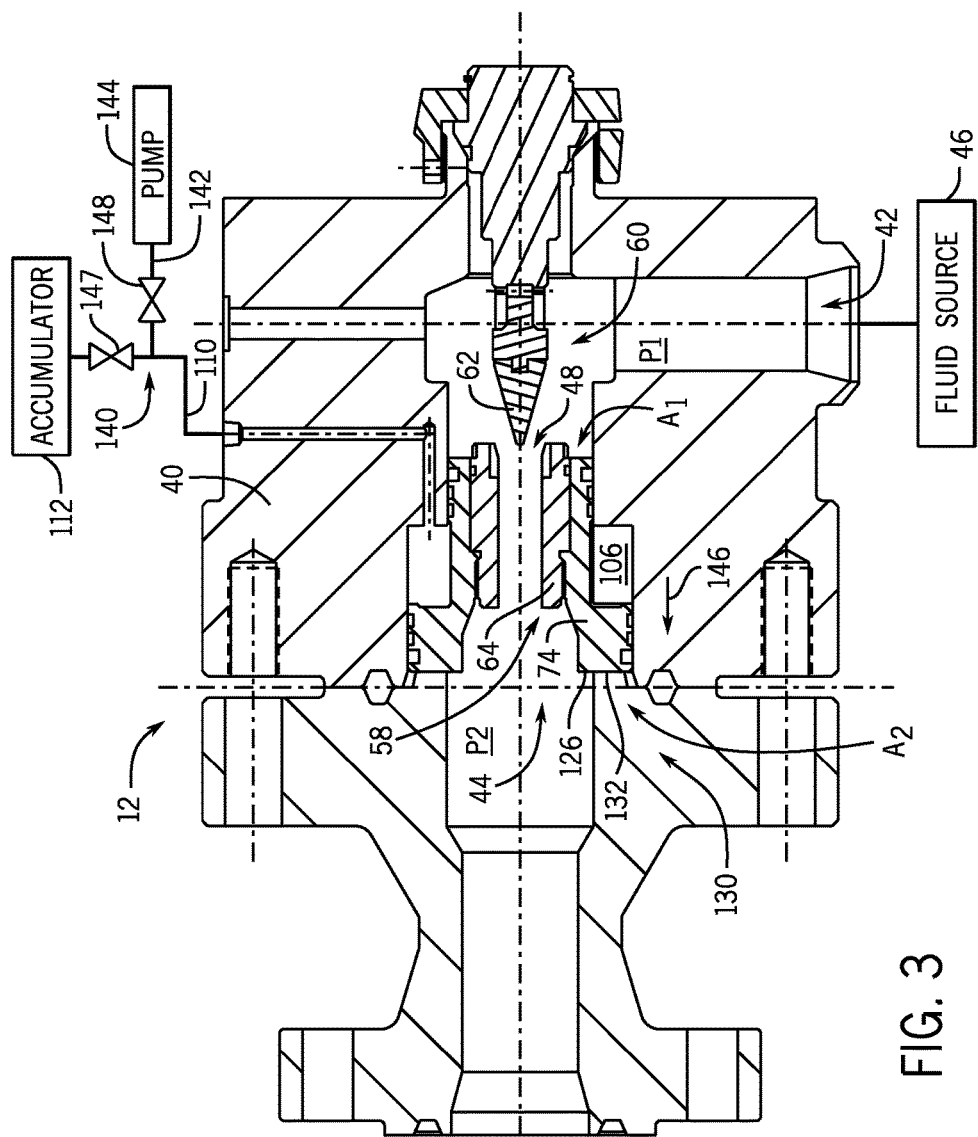
FIG. 3 is a cross-sectional side view of the choke of FIG. 2 in a fully open configuration, in accordance with an embodiment of the present disclosure.

FIG. 3 is a cross-sectional side view of the choke 12 of FIG. 2 in a fully open configuration 130, in accordance with an embodiment of the present disclosure. During certain operations, the choke 12 may become blocked by debris (e.g., rocks, sand, or the like). In such cases, it may be desirable to force the choke 12 into the fully open configuration 130 in which the flow area of the throttling orifice 48 is at a maximum and the second end 126 of the intensifier piston 74 abuts a wall 132 of the choke body 40, thereby enabling the particles to move through the throttling orifice 48 and unblocking the choke 12. Accordingly, certain disclosed embodiments may include a tee 140 positioned along the port 110 and coupled to a high-pressure port 142 that extends to a pump 144. A valve 148 (e.g., a needle valve) is positioned along the high-pressure port 142 between the tee 140 and the pump 144 to adjust fluid flow. The valve 148, the pump 144, and/or a valve 147 between the accumulator 112 and volume 106 may be controlled (e.g., by an operator or an electronic controller) to temporarily increase the pressure of the fluid flowing through the port 110 into the volume 106, thereby driving the intensifier piston 74 axially, as shown by arrow 146 until the second end 126 of the intensifier piston 74 abuts the wall 132 of the choke body 40. In some embodiments, a sensor (e.g., a pressure sensor, a flow sensor, an optical sensor, or the like) may provide signals indicative of pressure, flow rate, obstructions, or the like, and the valve 148 may be controlled based on such feedback. Thus, the choke 12 may be forced into the fully open configuration 130, advantageously enabling debris to flow through the choke 12.

It should be understood that the valve 148 and the pump 144 may be positioned in any suitable location. For example, in some embodiments, the valve 148 and the pump 144 may be positioned to enable a temporary increase in the pressure within the volume 106, thereby driving the intensifier piston 74 toward the wall 132 of the choke body 40 and forcing the choke 12 into the fully open configuration 130.

Additionally, the pump 144 may enable an effective change in the ratio of the first fluid contacting cross-sectional area $A_1$ to the second fluid contacting cross-sectional area $A_2$, thereby enabling a change in the percent pressure drop provided by the choke 12 without replacing or structurally altering the intensifier piston 74 or the seat 64. For example, the pump 144 may pump fluid into the volume 106 at a pressure that drives the intensifier piston 74 axially as shown by arrow 146. In such cases, the ratio of the first fluid contacting cross-sectional area $A_1$ to the second fluid contacting cross-sectional area $A_2$ may be effectively reduced and the percent pressure drop provided by the choke 12 may be reduced. Additionally, as noted above, the movable component 58 is configured to move axially in response to changes in the inlet pressure $P_1$. However, in some cases, the inlet pressure $P_1$ may exceed a threshold pressure, thereby forcing the choke 12 into the fully open configuration 130. In such cases, the flow area of the throttling orifice 48 may not provide the percent pressure drop across the choke 12 based on the ratio of the first fluid contacting cross-sectional area $A_1$ to the second fluid contacting cross-sectional area $A_2$, but rather, the flow area of the throttling orifice 48 may be at a maximum and enable a lowest available pressure drop.

Figure 4:
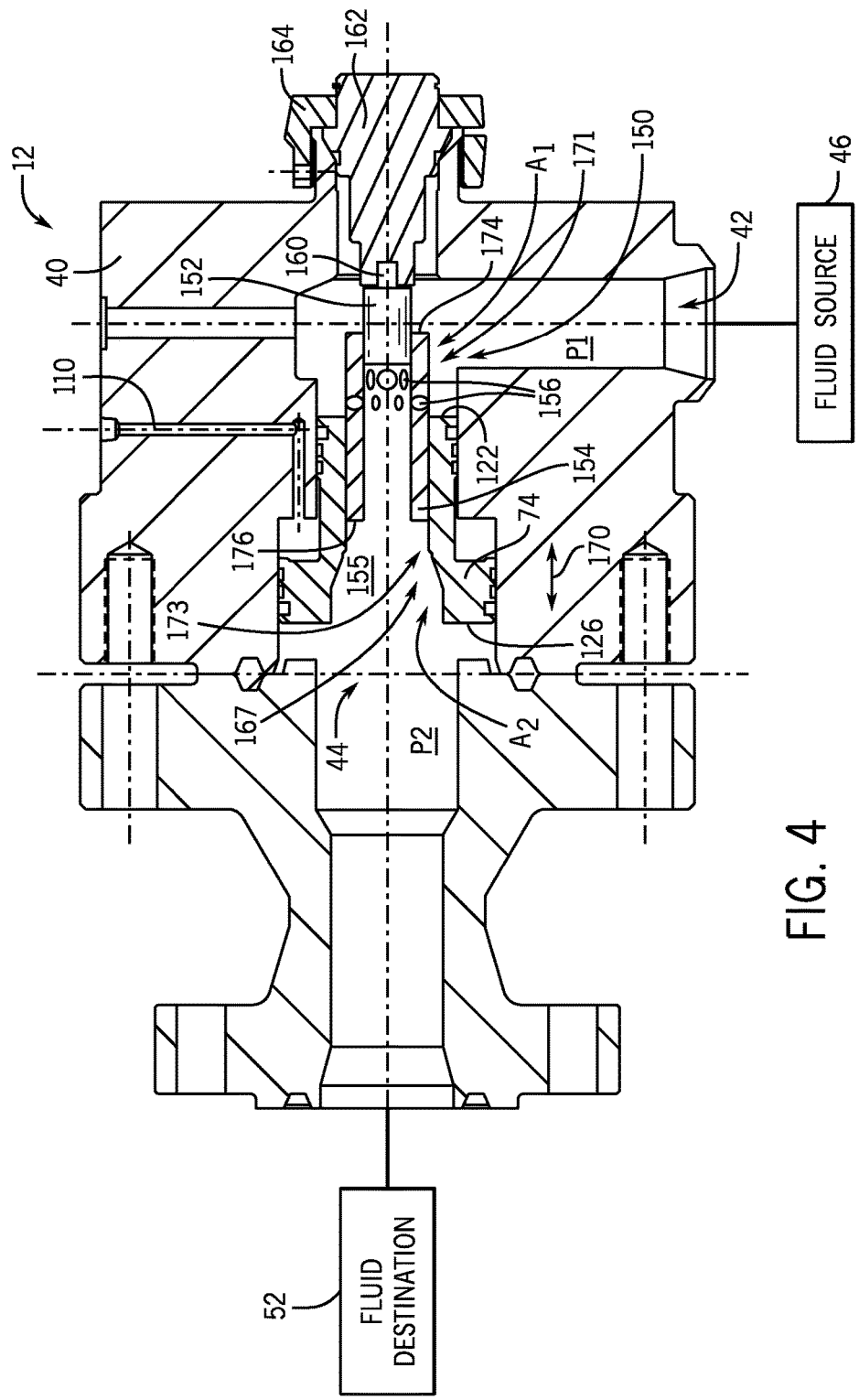
FIG. 4 is a cross-sectional side view of the choke of FIG. 1 having a plug and cage trim, in accordance with an embodiment of the present disclosure.

FIG. 4 is a cross-sectional side view of an embodiment of the choke of FIG. 1 having a plug and cage trim 150 (e.g., an annular trim) with a fixed plug 152 (e.g., an annular plug) and a movable cage 154 (e.g., an annular cage). As shown, a portion of the cage 154 is disposed circumferentially about a portion of the plug 52. The cage 154 includes a plurality of passageways 156 (e.g., radial ports) spaced circumferentially and/or axially about the cage 154 and configured to receive the fluid from the inlet 42. The cage 154 is generally annular, enabling the fluid to flow from the inlet 42, through the plurality of passageways 156 and an opening 155, and toward the outlet 44. The fluid received at the inlet 42 is throttled by the plurality of passageways 156 as the fluid flows toward the outlet 44. In the illustrated configuration, a total open flow area of the plurality of passageways 156 is adjusted as the cage 154 moves axially relative to the plug 152. The plug 152 may be generally cylindrical and may be coupled to the choke body 40 via any suitable coupling. For example, the plug 152 may be coupled (e.g., brazed) to a threaded plug 160, which may be coupled (e.g., threadably coupled) to a stem 162 (e.g., a bonnet stem). The stem 162 may be coupled to the choke body 40 via any suitable fastener 164 (e.g., a removable fastener, such as a wing nut). Thus, the plug 152 is a fixed component that is held in a fixed position relative to the choke body 40 and relative to the inlet 42. The plug 152, the cage 154, and other components of the choke 12 may be formed from any suitable material.

As shown, the cage 154 is coupled to the intensifier piston 74. Together, the cage 154 and the intensifier piston 74 may form a movable component 167 of the choke valve 12 and may move together (e.g., slidingly move or slide) relative to the plug 152 and/or relative to other components of the choke valve 12. The cage 154 may be coupled to the intensifier piston 74 via any suitable coupling, including those discussed above with respect to FIG. 2. As noted above, the movable component 167 may automatically translate axially, as shown by arrow 170, to provide a certain percent pressure drop between the inlet pressure $P_1$ at the inlet 42 and the outlet pressure $P_2$ at the outlet 44 of the choke 12. Thus, the outlet pressure $P_2$ of the fluid is a certain percentage less than the inlet pressure $P_1$ across a range of various inlet pressures (e.g., as the inlet pressure varies). In a similar manner as discussed above with respect to FIG. 2, the percent pressure drop provided by the choke 12 is based on the ratio of the first fluid contacting cross-sectional area $A_1$ at a first end 171 of the movable component 167 (e.g., a first sum of a cross-sectional area of a first end 122 of the intensifier piston 74 and a cross-sectional area of a first end 174 of the cage 154 in the illustrated embodiment) proximate the inlet 42, and a second fluid contacting cross-sectional contact area $A_2$ at a second end 173 of the movable component 167 (e.g., a second sum of a cross-sectional area of a second end 126 of the intensifier piston 74 and a cross-sectional area of a second end 176 of the cage 154 in the illustrated embodiment) proximate the outlet 44.

As discussed above, the movable component 167 may be configured to automatically move (e.g., self-adjust) such that a first product of the first fluid contacting cross-sectional area $A_1$ and the inlet pressure $P_1$ equals a second product of the second fluid contacting cross-sectional area $A_2$ and the outlet pressure $P_2$ (e.g., $(A_1)(P_1)=(A_2)(P_2)$), thereby balancing the forces of fluids across the movable component 167. As noted above, the choke 12 may be configured to have any suitable ratio of the first fluid contacting cross-sectional area $A_1$ to the second fluid contacting cross-sectional area $A_2$ (e.g., by varying the size and/or configuration of the intensifier piston 74 and/or the cage 154), such as approximately 2:1, 3:1, 4:1, 5:1, 6:1, 7:1, 8:1, 9:1, 10:1, or any ratio therebetween. In some embodiments, the ratio may be between approximately 2-10:1, 3-9:1, 4-8:1, or 5-7:1, for example. Thus, the choke 12 may be configured to reduce the pressure of the fluid flowing through the choke 12 by approximately 10-90 percent, 20-80 percent, 30-70 percent, 40-60 percent, or 50-70 percent, or any other suitable percentage. As noted above, the disclosed embodiments enable the choke 12 to automatically throttle the flow of fluid and provide a consistent percent pressure drop without manual adjustment of the choke 12 by an operator and/or without electronic adjustment of the choke 12 (e.g., without an electronic control system that controls an actuator to move the choke 12).

Figure 5:
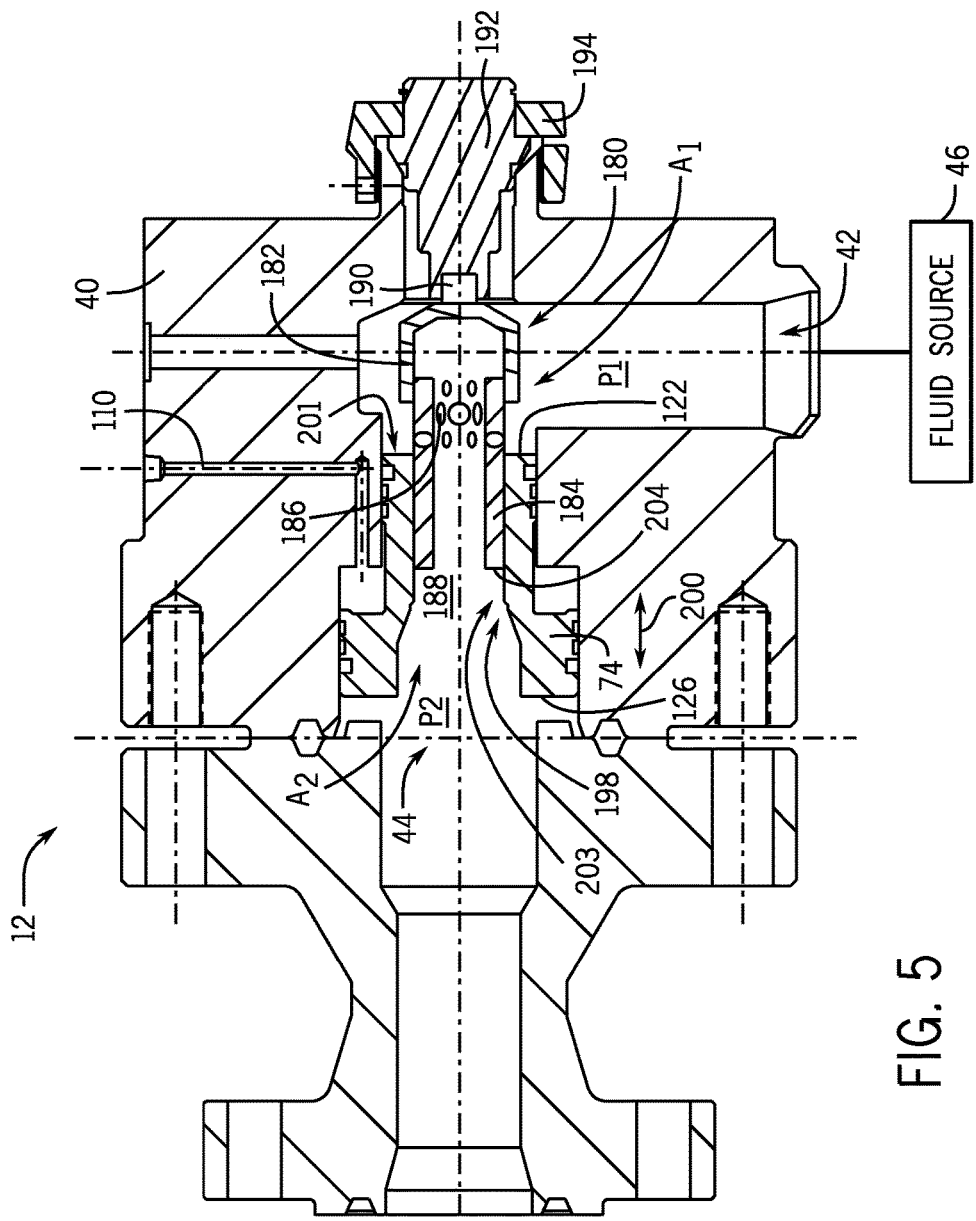
FIG. 5 is a cross-sectional side view of the choke of FIG. 1 having an external sleeve trim, in accordance with an embodiment of the present disclosure.

FIG. 5 is a cross-sectional side view of an embodiment of the choke of FIG. 1 having an external sleeve trim 180 (e.g., annular trim) with a fixed external sleeve 182 (e.g., fixed external annular sleeve) and a movable internal cage 184 (e.g., annular movable internal cage). As shown, a portion of the external sleeve 182 is disposed circumferentially about a portion of the internal cage 184. The internal cage 184 includes a plurality of passageways 186 (e.g., radial ports) spaced circumferentially and/or axially about the internal cage 184 and configured to receive the fluid from the inlet 42. The internal cage 184 is generally annular, enabling the fluid to flow from the inlet 42, through the plurality of passageways 186 and an opening 188, and toward the outlet 44. The fluid received at the inlet 42 is throttled by the plurality of passageways 186 as the fluid flows toward the outlet 44. In the illustrated configuration, a total open flow area of the plurality of passageways 186 changes as the internal cage 184 moves axially relative to the external sleeve 182.

The external sleeve 182 is generally annular and is configured to receive the internal cage 184. Additionally, the external sleeve 182 may be coupled to the choke body 40 via any suitable coupling. For example, the external sleeve 182 may be coupled (e.g., brazed) to a threaded plug 190, which may be coupled (e.g., threadably coupled) to a stem 192 (e.g., a bonnet stem). The stem 192 may be coupled to the choke body 40 via any suitable fastener 194 (e.g., removable fastener, such as a wing nut). Thus, the external sleeve 182 is held in a fixed position relative to the choke body 40 and relative to the inlet 42. The external sleeve 182, the internal cage 184, and other components of the choke 12 may be formed from any suitable material.

As shown, the internal cage 184 is coupled to the intensifier piston 74. Together, the internal cage 184 and the intensifier piston 74 may form a movable component 198 of the choke valve 12 and may move together (e.g., slidingly move or slide) relative to the external sleeve 182 and/or relative to other components of the choke valve 12. The internal cage 184 may be coupled to the intensifier piston 74 via any suitable coupling, including those discussed above with respect to FIG. 2. As noted above, the intensifier piston 74 may automatically translate axially, as shown by arrow 200, to provide a certain percent pressure drop between the inlet pressure $P_1$ at the inlet 42 and the outlet pressure $P_2$ at the outlet 44 of the choke 12. Thus, the outlet pressure $P_2$ of the fluid is a certain percentage less than the inlet pressure $P_1$ across a range of various inlet pressures (e.g., as the inlet pressure varies). In a similar manner as discussed above with respect to FIGS. 2 and 4, the percent pressure drop provided by the choke 12 is based on the ratio of the first fluid contacting cross-sectional area $A_1$ at a first end 201 of the movable component 198 (e.g., a cross-sectional area of a first end 122 of the intensifier piston 74 in the illustrated embodiment) proximate the inlet 42, and a second fluid contacting cross-sectional contact area $A_2$ at a second end 203 of the movable component 198 (e.g., a sum of a cross-sectional area of a second end 126 of the intensifier piston 74 and a cross-sectional area of a second end 204 of the internal cage 184 in the illustrated embodiment) proximate the outlet 44.

As discussed above, the movable component 198 may be configured to automatically move (e.g., self-adjust) such that a first product of the first fluid contacting cross-sectional area $A_1$ and the inlet pressure $P_1$ equals a second product of the second fluid contacting cross-sectional area $A_2$ and the outlet pressure $P_2$ (e.g., $(A_1)(P_1)=(A_2)(P_2)$), thereby balancing the forces across the movable component 198. As noted above, the choke 12 may be configured to have any suitable ratio of the first fluid contacting cross-sectional area $A_1$ to the second fluid contacting cross-sectional area $A_2$ (e.g., by varying the size and/or configuration of the intensifier piston 74 and/or the internal cage 184), such as approximately 2:1, 3:1, 4:1, 5:1, 6:1, 7:1, 8:1, 9:1, 10:1, or any ratio therebetween. In some embodiments, the ratio may be between approximately 2-10:1, 3-9:1, 4-8:1, or 5-7:1, for example. Thus, the choke 12 may be configured to reduce the pressure of the fluid flowing through the choke 12 by approximately 10-90 percent, 20-80 percent, 30-70 percent, 40-60 percent, or 50-70 percent, or any other suitable percentage. As noted above, the disclosed embodiments enable the choke 12 to automatically throttle the flow of fluid and provide a consistent percent pressure drop without manual adjustment of the choke 12 by an operator and/or without electronic adjustment of the choke 12 (e.g., without an electronic control system that controls an actuator to move the choke 12).

Figure 6:
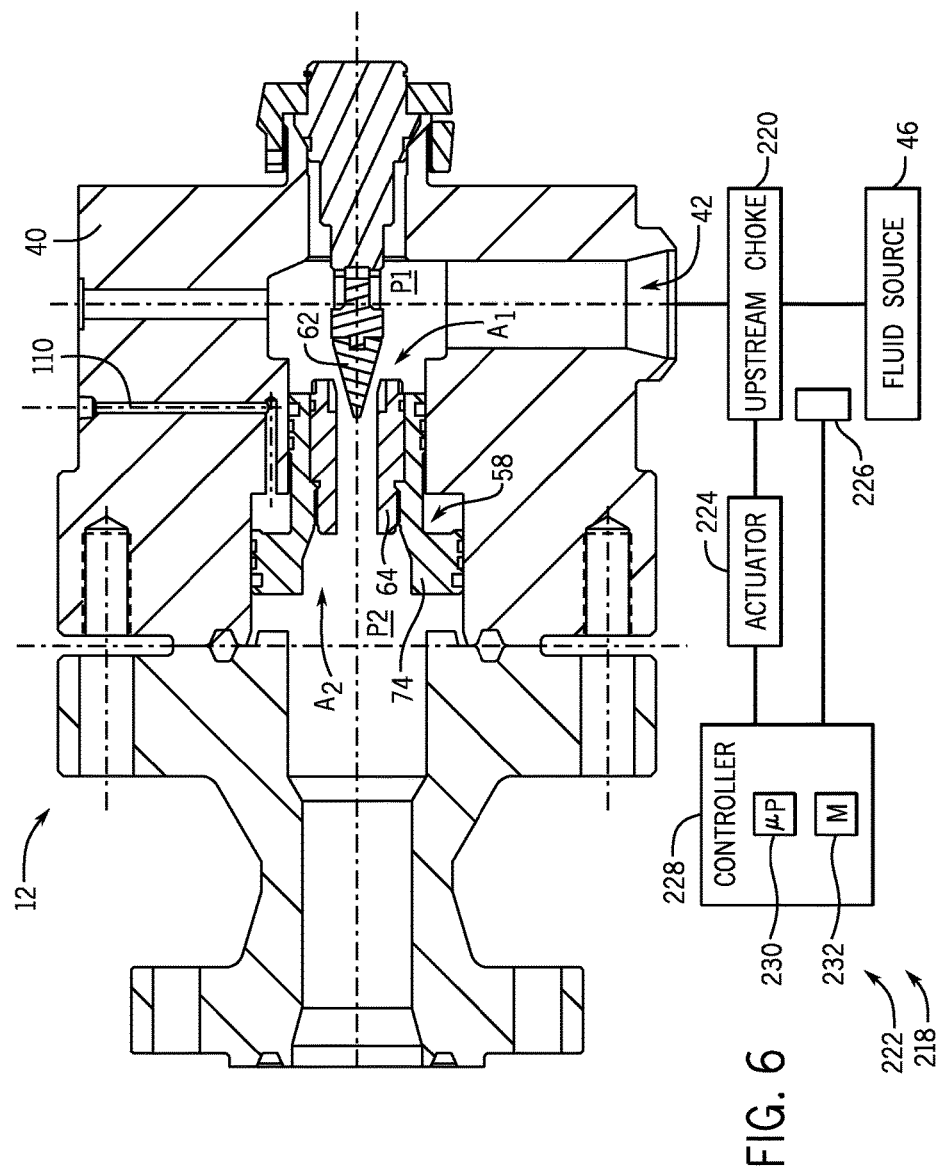
FIG. 6 is a cross-sectional side view of multiple chokes in series, in accordance with an embodiment of the present disclosure.

FIG. 6 is a cross-sectional side view of a choke system 218 having multiple chokes in series. As noted above, in some embodiments, it may be desirable to utilize the choke 12 in series with another choke 220 (e.g., an upstream choke 220, or a downstream choke as noted below). In the illustrated embodiment, the upstream choke 220 may receive the fluid from the fluid source 46, reduce the pressure of the fluid, and direct the fluid toward the inlet 42 of the choke 12. In accordance with the embodiments discussed above, the choke 12 may be configured to receive the fluid output by the upstream choke 220, which may be at the inlet pressure $P_1$, and provide a certain percent pressure drop based on the ratio of the first fluid contacting cross-sectional area $A_1$ to the second fluid contacting cross-sectional area $A_2$.

The upstream choke 220 may be any suitable adjustable choke. For example, the upstream choke 220 may be adjusted via a control system 222 having an actuator 224, a pressure sensor 226, and a controller 228. In certain embodiments, the controller 228 is an electronic controller having electrical circuitry configured to process data from the pressure sensor 226 and/or other components of the control system 222. In the illustrated embodiment, the controller 228 includes a processor, such as the illustrated microprocessor 230, and a memory device 232. The controller 228 may also include one or more storage devices and/or other suitable components. The processor 230 may be used to execute software, such as software for controlling the upstream choke 220, and so forth. Moreover, the processor 230 may include multiple microprocessors, one or more "general-purpose" microprocessors, one or more special-purpose microprocessors, and/or one or more application specific integrated circuits (ASICS), or some combination thereof. For example, the processor 230 may include one or more reduced instruction set (RISC) processors.

The memory device 232 may include a volatile memory, such as random access memory (RAM), and/or a nonvolatile memory, such as ROM. The memory device 232 may store a variety of information and may be used for various purposes. For example, the memory device 232 may store processor-executable instructions (e.g., firmware or software) for the processor 232 to execute, such as instructions for controlling the upstream choke 220. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., position data, pressure data, etc.), instructions (e.g., software or firmware for controlling the upstream choke 220, etc.), and any other suitable data.

The control system 222 may be configured to adjust the upstream choke 220 to output the fluid at a predetermined pressure, which may be preprogrammed in the memory device 232 or input by an operator, for example. To output the fluid at the predetermined pressure, the pressure sensor 226 may detect the pressure of the fluid received from the fluid source 46, provide a signal indicative of the pressure to the processor 232, and the processor 232 may provide a signal to actuate the actuator 224 to adjust a throttling orifice of the upstream choke 220 such that the fluid is output at the predetermined pressure.

The fluid may then flow from the upstream choke 220 to the inlet 42 of the choke 12. As the fluid contacts the first fluid contacting cross-sectional area $A_1$, the movable component 58 may automatically move (e.g., self-adjust) axially until the first product of the first fluid contacting cross-sectional area $A_1$ and the inlet pressure $P_1$ equals the second product of the second fluid contacting cross-sectional area $A_2$ and the outlet pressure $P_2$ (e.g., $(A_1)(P_1)=(A_2)(P_2)$), thereby balancing the forces across the movable component 58, as discussed above. Such a configuration facilitates automatic coordination of the upstream choke 220 and the choke 12 and enables the choke system 218 to automatically and reliably distribute and balance the pressure drop across the upstream choke 220 and the choke 12. Such a configuration also reduces the cost and complexity related to coordinating the operation of multiple chokes in series.

By way of further example, in certain embodiments, it may be desirable for the choke system 218 to provide the fluid via the outlet 42 at a target pressure, such as 1200 PSI. Additionally, a ratio of the first fluid contacting cross-sectional area $A_1$ to the second fluid contacting cross-sectional area $A_2$ may be a known ratio, such as 1:3. Accordingly, the control system 222 may be configured to control the upstream choke 220 to output the fluid at the predetermined pressure of 3600 PSI. When the upstream choke 220 outputs the fluid at the predetermined pressure of 3600 PSI, the movable component 58 of the choke 12 automatically moves to balance the forces across the movable component 58, thereby adjusting the throttling orifice such that the pressure at the outlet 42 is 1200 PSI. Thus, in this embodiment, adjustment of only the upstream choke 220 by the control system 222 may result in distribution of the pressure drop across both the upstream choke 220 and the choke 12 and may enable the choke system 218 to output the fluid from the outlet 42 at the target pressure of 1200 PSI without the use of additional controllers, actuators, or pressure sensors dedicated to the choke 12.

By way of example, in certain embodiments, the choke system 218 having multiple chokes in series may include 2, 3, 4, or more chokes of various configurations. For example, as noted above, a first choke (e.g., an upstream choke) may be similar to the choke 12 disclosed herein and may be configured to self-adjust in response to an inlet pressure, thereby enabling the first choke to provide a particular percent pressure drop across the first choke without the use of additional electronic control and actuators dedicated to the first choke. In such cases, the second choke (e.g., a downstream choke) or other downstream chokes, may have a similar configuration as the first choke (e.g., have a configuration similar to that of choke 12 disclosed herein) or may be an adjustable choke that is controlled manually by an operator and/or by a system of electronic controls and actuators, such as the choke 220 discussed above, for example.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a choke valve coupled to a production tree positioned vertically above a well of a mineral extraction system to facilitate flow of fluid between surface equipment and the well, the choke valve comprising:
a fluid inlet comprising a central axis and configured to receive a fluid at a first pressure;
a fluid outlet configured to output the fluid at a second pressure;
a fixed component and a movable component defining a throttling orifice between the fluid inlet and the fluid outlet, wherein the movable component is configured to automatically move relative to the fixed component along a longitudinal axis that is transverse to the central axis in response to a change in the first pressure to provide a percent pressure drop between the first pressure at the fluid inlet and the second pressure at the fluid outlet, the movable component comprises an upstream end portion proximate the fluid inlet and comprising a first cross-sectional area, the moveable component comprises a downstream end portion proximate the fluid outlet and comprising a second cross-sectional area that is greater than the first cross-sectional area, the fixed component comprises a needle, the movable component comprises a seat that is configured to receive the needle and an intensifier piston positioned circumferentially about the seat, and a radially-outer surface of the seat contacts a radially-innermost surface of the intensifier piston.

2. The system of claim 1, wherein the movable component is configured to automatically move without interaction with an operator, a motor, or an electronic controller.

3. The system of claim 1, wherein the seat extends from a first end proximate to the inlet and a second end proximate to the outlet, and the first end supports a carbide tip.

4. The system of claim 1, wherein the seat is threadably coupled to the intensifier piston.

5. The system of claim 1, wherein the percent pressure drop provided by the choke valve is based on a ratio of the first cross-sectional area to the second cross-sectional area.

6. The system of claim 1, comprising:
a pump configured to be selectively fluidly coupled to an annular volume disposed between a portion of a radially-outer surface of the movable component and a portion of a radially-inner surface of the valve body; and
a controller configured to control a valve to fluidly couple the pump to the annular volume to enable the pump to increase a respective pressure within the annular volume, thereby driving the movable component away from the fixed component.

7. The system of claim 1, comprising a port extending from an accumulator to an annular volume disposed between a portion of a radially-outer surface of the movable component and a portion of a radially-inner surface of the valve body while the choke valve is in an open configuration, wherein the port is configured to transfer a stored fluid between the accumulator and the annular volume as the movable component moves relative to the fixed component.

8. The system of claim 7, comprising a pump coupled to the port, wherein the pump enables adjustment of a pressure within the annular volume to drive the movable component away from the fixed component.

9. A system, comprising:
a choke valve, comprising:
 a valve body;
 a fixed component and an annular movable component, wherein the fixed component and the annular movable component are positioned within the valve body and define a throttling orifice configured to receive a fluid at a first pressure and to output the fluid at a second pressure, lower than the first pressure;
 wherein the annular movable component comprises a first cross-sectional area configured to be in contact with the fluid at the first pressure and a second cross-sectional area, greater than the first cross-sectional area, and configured to be in contact with the fluid at the second pressure, and wherein the annular moveable component is configured to automatically move relative to the fixed component to output the fluid at the second pressure;
a port extending from an accumulator to an annular volume defined between a radially-outer surface of the annular movable component and a radially-inner surface of the valve body while the choke valve is in an open configuration, wherein the port is configured to transfer a stored fluid between the accumulator and the annular volume as the annular movable component moves relative to the fixed component;
a sensor configured to generate a signal indicative of debris within the choke valve; and
a controller configured to receive the signal and to control a valve to fluidly couple a pump to the annular volume to increase a respective pressure within the annular volume based on the signal, thereby driving the annular movable component to facilitate removal of the debris from the choke valve.

10. The system of claim 9, wherein the fixed component comprises a needle and the annular movable component comprises a seat that is configured to receive the needle.

11. A system, comprising:
a first choke valve, comprising:
 a valve body;
 a fixed component coupled to the valve body;
 a movable component slidingly disposed within the valve body, wherein the movable component comprises a seat and an intensifier piston, the intensifier piston is positioned circumferentially about the seat, the seat is removably coupled to the intensifier piston, the movable component comprises an upstream end comprising a first cross-sectional area and a downstream end comprising a second cross-sectional area, the upstream end is upstream of the downstream end relative to a direction of fluid flow through the first choke valve, and the second cross-sectional area is greater than the first cross-sectional area; and
 a throttling orifice defined by the fixed component and the movable component and configured to receive a fluid at a first pressure and to output the fluid at a second pressure, lower than the first pressure;
 wherein the movable component is configured to automatically slide within the valve body in response to a change in the first pressure until a first force exerted by the fluid at the first pressure on the movable component is substantially equal to a second force exerted by the fluid at the second pressure on the movable component;
 wherein the choke valve is coupled to a production tree positioned vertically above a well of a mineral extraction system to facilitate flow of the fluid between surface equipment and the well.

12. The system of claim 11, wherein the first choke valve is configured to provide a consistent percent change in pressure between the first pressure and the second pressure as the first pressure changes.

13. The system of claim 11, comprising a second choke valve upstream from the first choke valve, wherein the second choke valve is configured to throttle a flow of fluid and to output the fluid at the first pressure.

14. The system of claim 11, wherein the seat is threadably coupled to the intensifier piston.

15. The system of claim 11, wherein the seat extends from a first end proximate to the upstream end of the intensifier piston and a second end proximate to the downstream end of the intensifier piston, and the first end supports a carbide tip.

16. The system of claim 11, wherein the valve body comprises a fluid inlet comprising a central axis and a fluid outlet, the throttling orifice is positioned between the fluid inlet and the fluid outlet, and the movable component is configured to automatically slide within the valve body along a longitudinal axis that is transverse to the central axis.

17. The system of claim 11, comprising:
a pump configured to be selectively fluidly coupled to an annular volume disposed between a portion of a radially-outer surface of the movable component and a portion of a radially-inner surface of the valve body;
a sensor configured to generate a signal indicative of debris within the choke valve; and
a controller configured to receive the signal and to control a valve to fluidly couple the pump to the annular volume to enable the pump to increase a respective pressure within the annular volume based on the signal, thereby driving the movable component away from the fixed component to facilitate removal of the debris from the choke valve.

18. The system of claim 11, wherein the movable component is configured to automatically slide within the valve body without use of a biasing member.

* * * * *